United States Patent
Wang et al.

[11] Patent Number: 6,127,803
[45] Date of Patent: Oct. 3, 2000

[54] MULTI-PURPOSE ELECTRIC CHARGING APPARATUS

[75] Inventors: Robert Wang, Taipei; Jack Wang, Taichung Hsien, both of Taiwan

[73] Assignee: Ceramate Technical Co., Ltd., Taiwan

[21] Appl. No.: 09/289,664

[22] Filed: Apr. 12, 1999

[51] Int. Cl.$^7$ .................................................. H01M 10/46
[52] U.S. Cl. ........................... 320/114; 320/115; 320/111
[58] Field of Search ..................................... 320/111, 112, 320/113, 114, 115, 126, 138, 107, FOR 102, FOR 155

[56] References Cited

U.S. PATENT DOCUMENTS

| | | | |
|---|---|---|---|
| 4,160,941 | 7/1979 | Bennett | 320/126 |
| 4,885,521 | 12/1989 | Crampton | 320/126 |
| 4,922,178 | 5/1990 | Matuszewski et al. | 320/111 |
| 5,160,879 | 11/1992 | Tortola et al. | 320/111 |
| 5,847,545 | 12/1998 | Chen et al. | 320/138 |

*Primary Examiner*—Edward H. Tso
*Attorney, Agent, or Firm*—Foley & Lardner

[57] ABSTRACT

A charging apparatus includes a housing, an AC input connector mounted on the housing for connection with an AC power supply source, a DC input connector mounted on the housing for connection with a DC power supply source, a voltage and current transforming device mounted inside said housing and connected to the AC and DC input connector, at least one current output wire connected electrically to the voltage and current transforming device and having an outer end extending out from the housing, and at least one output connector connected to the current output wire for connection with an article to be charged. The output connector includes a pair of socket and plug connector parts, one of which is fixed to the current output wire and the other one of which is adapted to connect with the article to be charged.

14 Claims, 5 Drawing Sheets

MULTI-PURPOSE ELECTRIC CHARGING APPARATUS

BACKGROUND OF THE INVENTION

1. Field of the Invention

The invention relates to an electric charging apparatus and, more particularly to a dual power source electric charging apparatus for charging electrical devices, such as batteries, portable telecommunication devices or the like.

2. Description of the Related Art

Charging apparatuses for charging portable telecommunications devices existing in the art are generally of two types, one being usable with an AC power source available in cars and the other with a DC power source available in houses. These types of charging apparatuses cannot be used interchangeably. FIG. 1 shows a conventional charging apparatus which can be used to charge either a portable telephone or a battery of the portable telephone. The apparatus comprises a seat body 1 which includes a receptacle 2 for connecting with the portable telephone, and a receptacle 3 for connecting with the battery. The seat body 1 is connected electrically to a rectifying transformer 5 via a connecting wire 4, and the rectifying transformer 5 can be plugged in a socket of a household power source. However, there are some problems encountered in this charging apparatus. First of all, the rectifying transformer 5 has limited application because it cannot be used with a power source available in a car. Furthermore, both receptacles 2 and 3 are customized so that they are suitable only to individual products. In addition, the voluminous seat body 1 and the lengthy connecting wire 4 are inconvenient for storage and transport.

SUMMARY OF THE INVENTION

An object of the invention is to provide an electric charging apparatus which overcomes the above-mentioned disadvantages encountered with the conventional charging apparatus.

Another object of the invention is to provide a multi-purpose charging apparatus which can be used with either an AC power source or a DC power source and which can be applied to charge various portable telecommunication devices and batteries customized by different manufacturers.

According to the present invention, an electric charging apparatus comprises a housing; an AC input connector mounted on the housing and adapted to connect with an AC power supply source; a DC input connector mounted on the housing and adapted to connect with a DC power supply source; a voltage and current transforming device mounted inside the housing and connected to the AC and DC input connectors; at least one current output wire connected electrically to the voltage and current transforming device and having an outer end extending out from the housing; and at least one output connector connected to the outer end of the current output wire and adapted to connect with an article to be charged.

Preferably, the output connector includes a socket connector part and a plug connector part that mates with the socket connector part. One of the socket and plug connector parts is fixed to the outer end of the current output wire, while the other one of the socket and plug connector parts is adapted to connect with the article to be charged.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
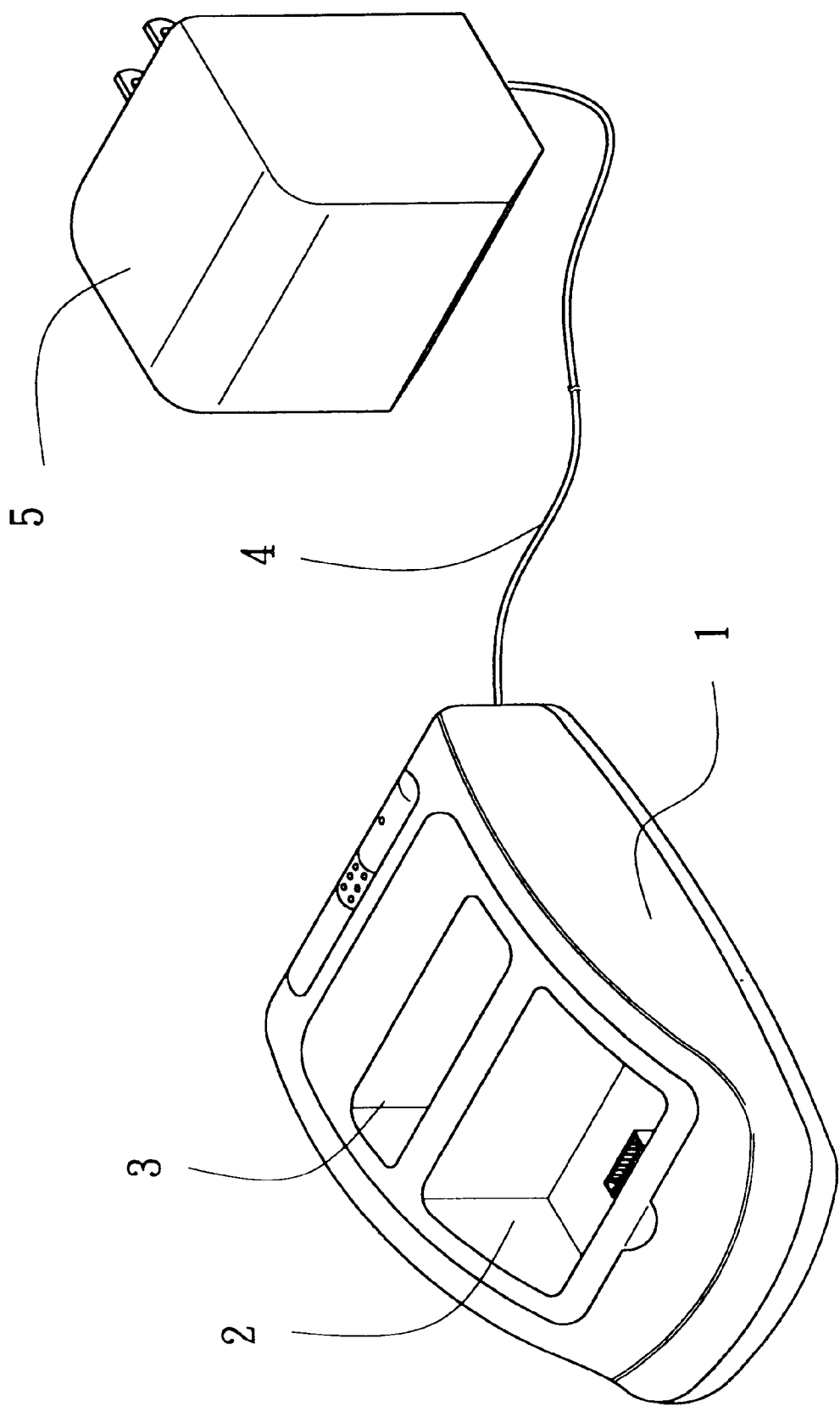
FIG. 1 shows a conventional charging apparatus.
Figure 2:
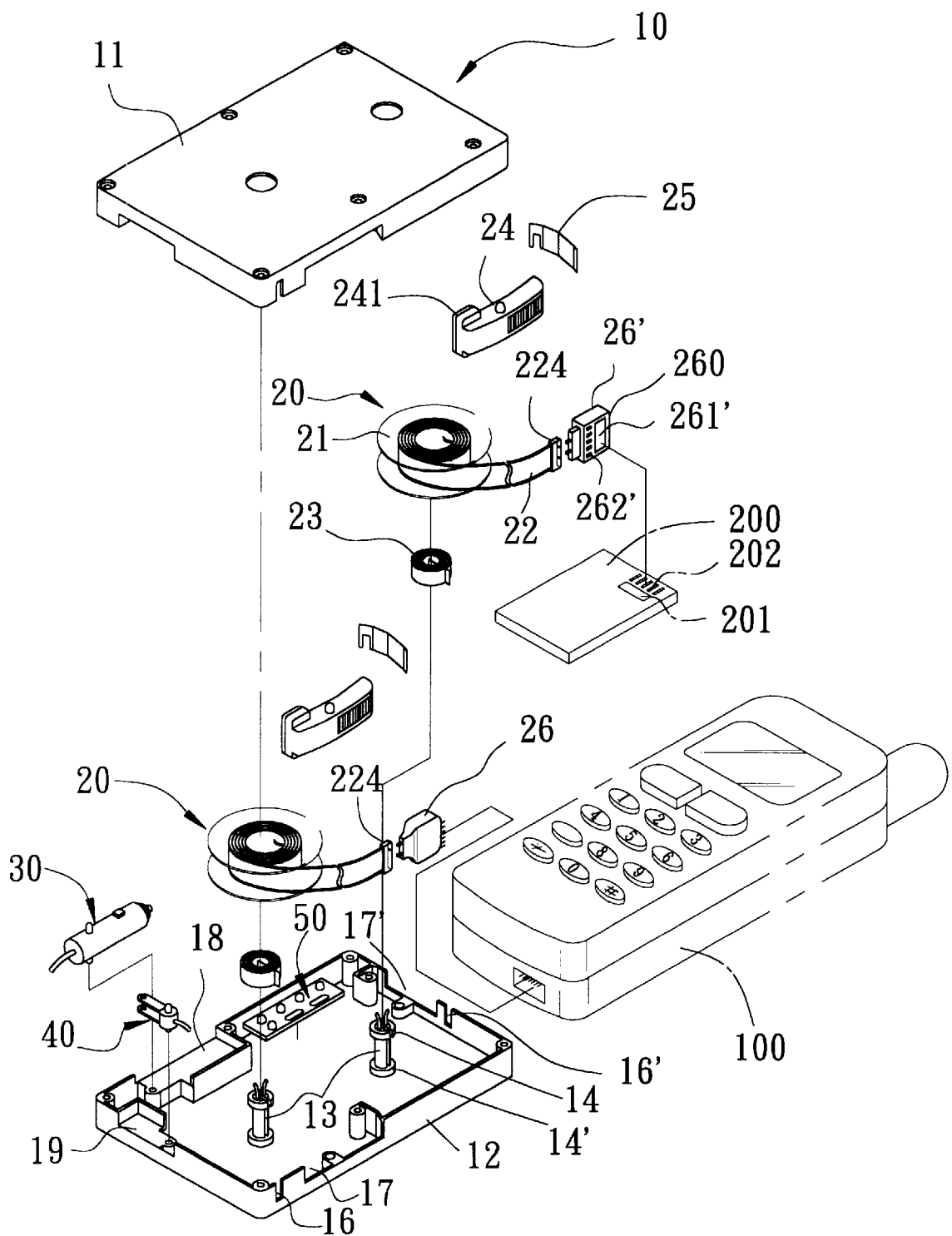
FIG. 2 is an exploded view of an electric charging apparatus embodying the present invention.
Figure 3:
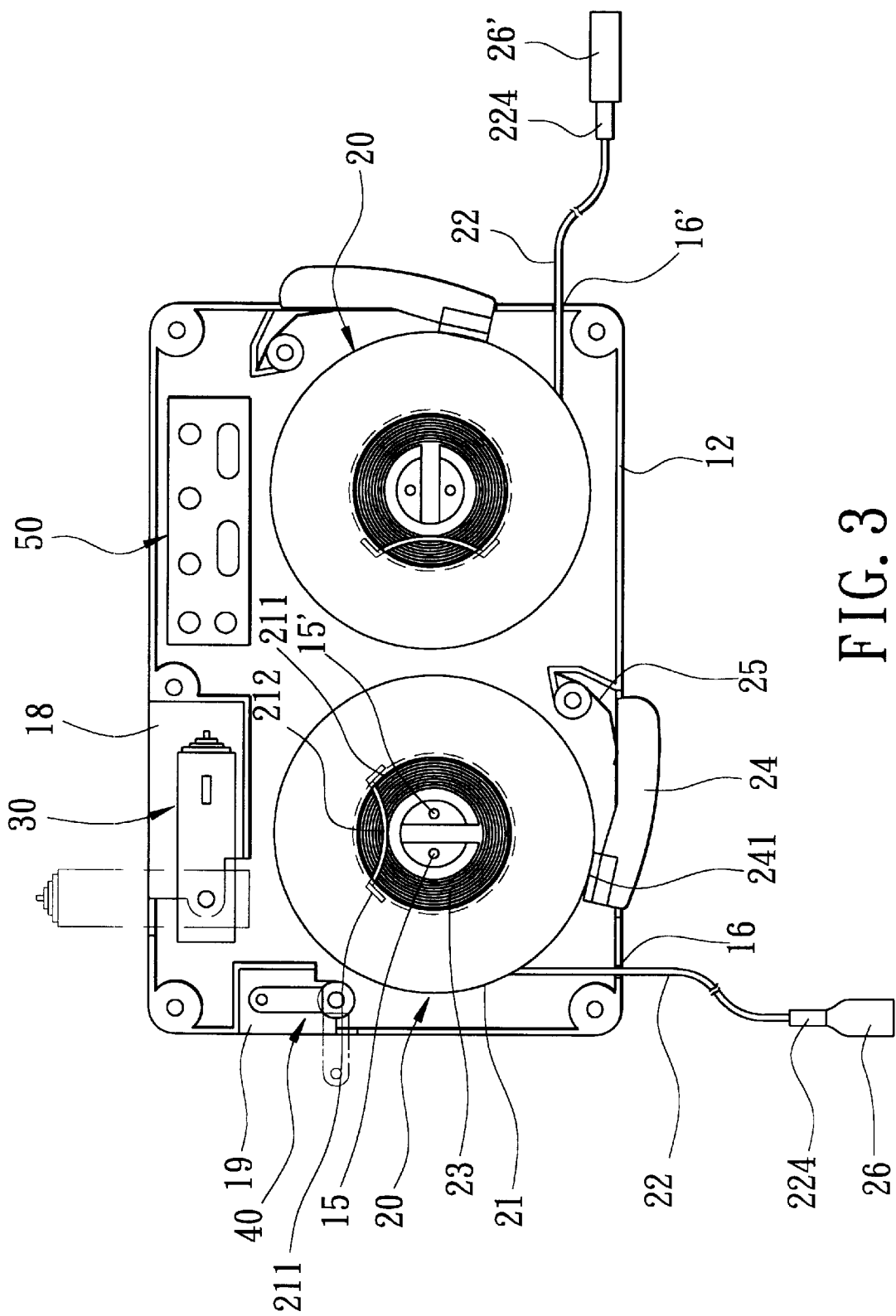
FIG. 3 is a plan view showing the electric charging apparatus of FIG. 2 with one of two housing halves removed for the sake of clarity.
Figure 4:
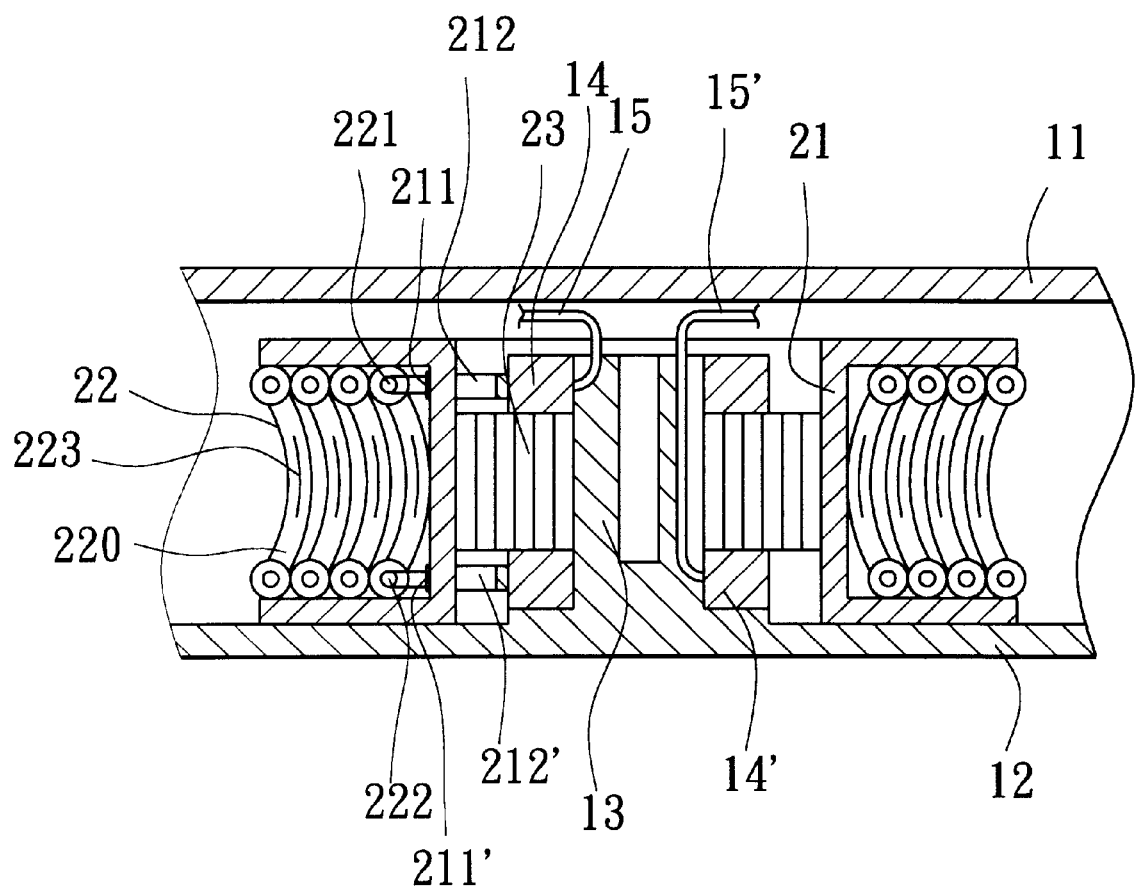
FIG. 4 is a partially sectioned view showing a reeling mechanism of the charging apparatus of FIG. 2.

Referring to FIGS. 2, 3 and 4, an electric charging apparatus embodying the present invention includes a housing 10, two reeling mechanisms 20, a DC input connector 30, an AC input connector 40, and a voltage and current transforming device 50.

The housing 10 includes upper and lower housing halves 11, 12 of substantially rectangular shape, which are coupled together. A pair of shafts 13 are mounted on the lower housing half 12 for supporting the reeling mechanisms 20, respectively. Two electrodes in the form of conductive rings 14, 14', which are made of copper, are sleeved around each shaft 13 at top and bottom ends of the shaft 13. The conductive rings 14, 14' are respectively connected to conducting wires 15, 15' which in turn are connected to the voltage and current transforming device 50.

Each reeling mechanism 20 includes a reel 21 sleeved onto the corresponding shaft 13 around the conductive rings 14, 14', and a torsion spring 23 provided between the shaft 13 and the reel 21 and between the two conductive rings 14, 14'. A current output wire 22 is wound around the reel 21 of each reeling mechanism 20 and has an outer end drawn out of the housing 10. The torsion spring 23 is connected to the shaft 13 and the reel 12 so that the reel 12 is normally urged to rotate in a direction that reels in the current output wire 22. There are two conductive spring plates 212, 212' which are in sliding contact with the conductive rings 14, 14' respectively and which have ends 211, 211' mounted on the reel 21 by extending through holes (not shown) formed in the reel 21, as best shown in FIG. 3.

The current output wire 22 is in the form of a flexible flat wire which contains two conductors 221, 222 wrapped by an insulative covering 220. The conductors 221, 222 are spaced apart widthwise in the insulative covering 220. A flexible and thin metal plate 223 is embedded in the insulative covering 220 between the conductors 221, 222, as best shown in FIG. 4, so that the current output wire 22 is slightly curved. The conductors 221, 222 are respectively connected to the conductive spring plates 212, 212' at an inner end of the current output wire 22, thus electrically connecting the conductors 221, 222 to the conductive rings 14, 14', respectively. Two outlet openings 16, 16' are provided at two sides of the housing 10, and the outer ends of the current output wires 22 of the two reeling mechanisms 20 are drawn out through the outlet openings 16, 16', respectively.

Each current output wire 22 is connected to an output connector which includes a socket connector part 224 and a plug connector part 26 or 26'. The socket connector part 224 is connected fixedly to the outer end of each current output wire 22 and mates with the plug connector part 26 or 26'. The plug connector parts 26, 26' may be in any form which can either mate with the socket connector part 224 or accommodate an article to be charged. In this embodiment, the plug connector parts 26, 26' are configured so as to match a portable telecommunications device, or a battery of the portable telecommunications device. The plug connector 26' is configured to include a flat outer face 260', a magnet piece 261' attached to the flat outer face 260', and electric contact elements 262' formed on the outer face 260'. The plug connector part 26' is connectable with a battery 200 used in a mobile telephone 100. The battery 200 has a metal plate 201 so that the battery 200 can be positioned to the plug connector part 26' by magnetic adhesion and so that the electrical contact elements 262' on the plug connector part 26' can be in electrical connection with electrical contacts 202 on the battery 200. The plug connector part 26 is configured so that it can be plugged into the mobile telephone 100.

Adjacent to the outlet openings 16, 16', there are two press buttons 24 which are mounted on the housing 10, and which are loaded respectively with resilient members 25. Each press button 24 has a pressing end 241 to depress and prevent the corresponding reel 21 from free rotation. The press button 24 can be pushed against the biasing action of the corresponding resilient member 25 to move the pressing end 241 away from the reel 21. In other words, the press button 24 is biased normally by the resilient member 25 to abut tightly and prevent the corresponding reel 21 from rotation. When the press button 24 is pushed manually against the action of the resilient member 25, the pressing end 241 is moved away from the reel 21, and the current output wire 22 is reeled in via the action of the torsion spring 23.

The DC input connector 30 is mounted pivotally on the housing 10 in a cavity 18 and is electrically connected to the voltage and current transforming device 50. The DC input connector 30 is insertable into a DC power supply outlet (not shown) of a car, which is used for a cigarette lighter.

The AC input connector 40 is mounted pivotally on the housing 10 in a cavity 19 and is electrically connected to the voltage and current transforming device 50. The AC input connector 40 can be connected to a household AC power supply outlet.

Figure 5:
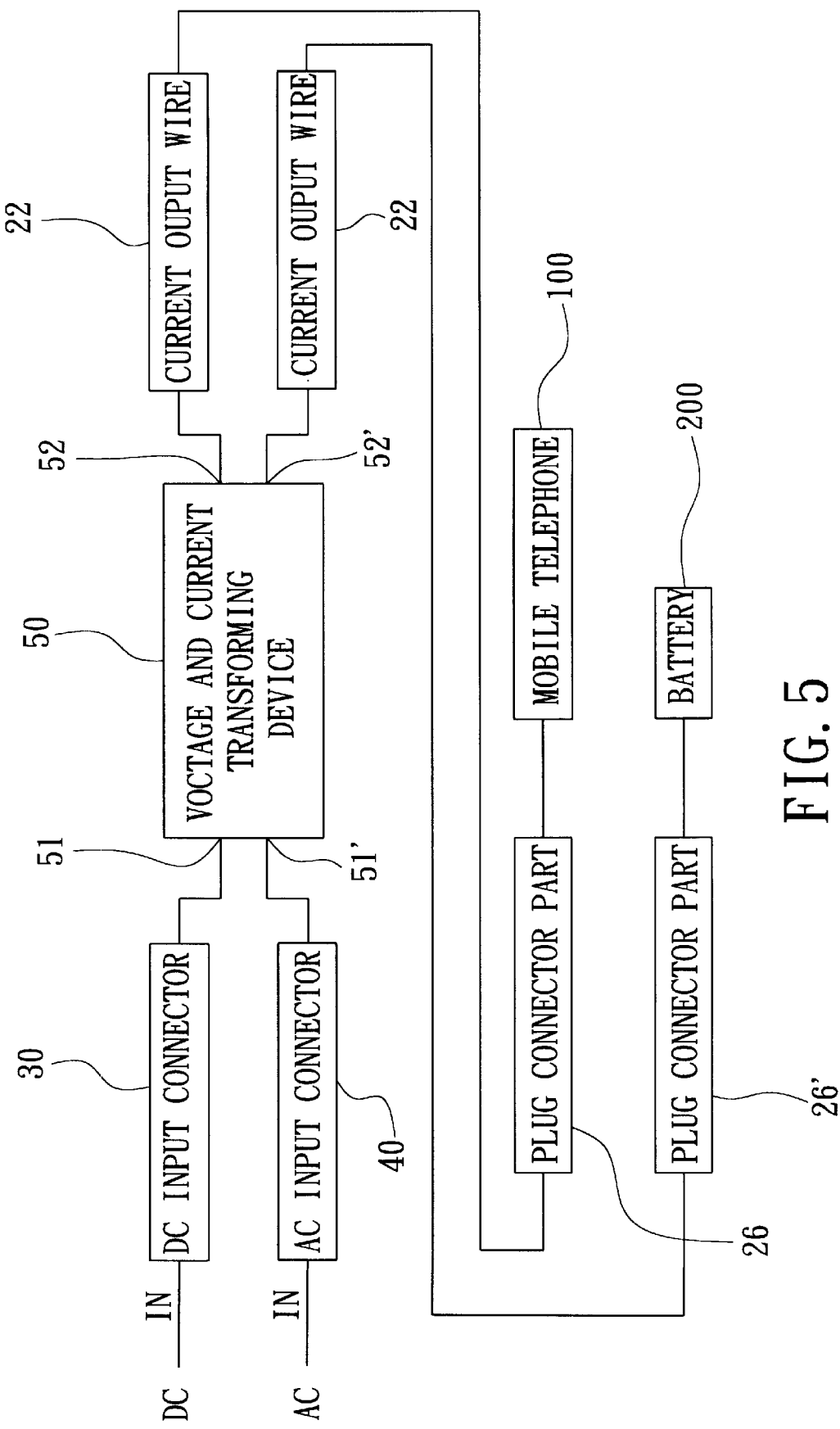
FIG. 5 is a block diagram illustrating an electrical circuit of the charging apparatus of FIG. 2.

As shown in FIG. 5, the voltage and current transforming device 50 which is mounted inside the housing 10 is provided with input terminals 51, 51' and output terminals 52, 52'. The input terminals 51, 51' are connected to the DC and AC input connectors 30, 40, and the output terminals 52, 52' are connected to the conducting wires 15, 15' directed from the reeling mechanisms 20. As such, the current fed to the voltage and current transforming device 50 from the DC or AC input connector 30 or 40 can be transmitted to the conducting wires 15, 15'. The conducting wires 15, 15' then sent the current to the current output wires 22 via the conducting rings 14, 14' and the conductive spring plates 212, 212'.

In application, the DC input connector 30 can be inserted into a DC power source socket (not shown) of a cigarette lighter, while the AC input connector 40 can be inserted into a household AC power source supply socket (not shown). The plug connector part 26 can be connected to a portable telecommunication device, such as a mobile telephone 100, whereas the plug connector part 26' can be connected electrically to a battery 200 by contacting the electric contact elements 262' of the plug connector part 26' with the contacts 202 disposed on the battery 200.

As described hereinabove, the current output wires 22 of the reeling mechanisms 20 can be reeled in and stored inside the housing 10 when the charging apparatus is not in use. Such an arrangement is advantageous for storage and transport. Furthermore, the provision of the socket connector parts 224 on each current output wire 22 permits the current output wire 22 to connect with different plug connector parts 26, 26', which are customized according to particular mobile telephones and batteries produced by different manufacturers. Moreover, the charging apparatus according to the present invention can be used with a DC power source in a car, or a household AC power source.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electric charging apparatus comprising:
    a housing;
    an AC input connector mounted on said housing and adapted to connect with an AC power supply source;
    a DC input connector mounted on said housing and adapted to connect with a DC power supply source;
    a voltage and current transforming device mounted inside said housing and connected to said AC and DC input connectors;
    a current output wire connected electrically to said voltage and current transforming device and having an outer end extending out from said housing;
    an output connector connected to said outer end of said current output wire and adapted to connect with an article to be charged; and
    a reeling mechanism mounted inside said housing and connected to said current output wire so as to reel in or reel off said current output wire.

2. The electric charging apparatus as claimed in claim 1, wherein said output connector includes a socket connector part and a plug connector part that mates with said socket connector part, one of said socket and plug connector parts being fixed to said outer end of said current output wire, the other one of said socket and plug connector parts being adapted to connect with the article.

3. The electric charging apparatus according to claim 2, wherein said other one of said socket and plug connector parts includes a flat outer face, electrical contact elements formed on said flat outer face, and a magnet attached to said flat outer face to provide a magnetic positioning effect.

4. The electric charging apparatus according to claim 1, wherein said AC input connector is a plug connector.

5. The electric charging apparatus according to claim 4, wherein said DC input connector is a plug-type connector.

6. The electric charging apparatus according to claim 1, further comprising a shaft mounted inside said housing, and a pair of spaced apart stationary electrodes mounted on said shaft, said reeling mechanism including a reel mounted rotatably on said shaft independently of said electrodes, and a torsion spring disposed between and connected to said reel and said shaft to urge said reel to rotate in a direction that conducts a reel-in operation, said stationary electrodes being connected electrically to said voltage and current transforming device, said current output wire being wound around said reel and connected electrically to said electrodes.

7. The electric charging apparatus according to claim 6, further comprising two conducting wires which are connected respectively to said electrodes and which extend to said voltage and current transforming device to establish electrical connection therewith, said electrodes including two conductive rings sleeved around said shaft in an axially spaced apart position.

8. The electric charging apparatus according to claim 1, further comprising manual control means mounted on said housing for controlling rotation of said reel.

9. The electric charging apparatus according to claim 8, wherein said control means includes a push button mounted pivotally on said housing adjacent to said reel, and a resilient member loaded on said push button, said push button having a press portion biased to abut against said reel.

10. An electric charging apparatus for charging a portable telecommunications device, as well as a batter incorporated in the telecommunications device, comprising:

a housing;

an AC input connector mounted on said housing and adapted to connect with an AC power supply source;

A DC input connector mounted on said housing and adapted to connect with a DC power supply source;

a voltage and current transforming device mounted inside said housing and connected to said AC and DC input connectors;

two current output wires connected to said voltage and current transforming device and having outer ends extending out from said housing;

two output connectors connected respectively to said outer ends of said current output wires, one of said output connectors being adapted to connect with the battery, the other one of said output connectors being adapted to connect with the portable telecommunications device; and a pair of reeling mechanisms mounted inside said housing and respectively connected to said current output wires so as to reel in or reel off said current output wires.

11. The electric charging device according to claim 10, wherein each of said output connectors includes a socket connector part and a plug connector part that mates with said socket connector part, one of said socket and plug connector parts being fixed to said outer end of a corresponding one of said current output wires, the other one of said socket and plug connector parts being adapted to connect with one of the battery and the portable telecommunications device.

12. The electric charging apparatus according to claim 10, wherein said other one of said socket and plug connector parts includes a flat outer face, electrical contact elements formed on said flat outer face, and a magnet attached to said flat outer face to provide a magnetic positioning effect.

13. The electric charging apparatus according to claim 12, wherein said AC input connector is a plug-type connector.

14. The electric charging apparatus according to claim 13, wherein said DC input connector is a plug-type connector.

\* \* \* \* \*